United States Patent Office 3,178,416
Patented Apr. 13, 1965

3,178,416
2β,19-OXIDO-5α-STEROIDS AND
PROCESS THEREFOR
Albert Wettstein, Riehen, and Georg Anner, Karl Heusler, and Jaroslav Kalvoda, Basel, Switzerland, assignors to Ciba Corporation, New York, N.Y., a corporation of Delaware
No Drawing. Filed Sept. 19, 1962, Ser. No. 224,854
Claims priority, application Switzerland, Sept. 22, 1961, 11,073/61; Aug. 31, 1962, 10,402/62
20 Claims. (Cl. 260—239.55)

The present invention relates to and has for its object the provision of new 2β,19-oxido-5α-steroids starting from 19-unsubstituted 2β-hydroxy-5α-steroids. Said oxido-steroids can be used, for example, for the preparation of important 19-nor-steroids (anabolic, progestative and estrogenic agents), such as derivatives of 19-nor-testosterone, 19-nor-progesterone, Δ¹-oxo-17β-hydroxy-19-nor-5α-androstene the 3-desoxo derivatives thereof or of estrone.

The process according to the present invention consists in reacting 19-unsubstituted 2β-hydroxy-5α-steroids with a compound generating monovalent positive iodine and, if desired, hydrolyzing and/or oxidizing the obtained 2β,19-oxido-5α-steroids.

The reaction occurring in the above said process may be represented, for example, by the following scheme of partial formulae

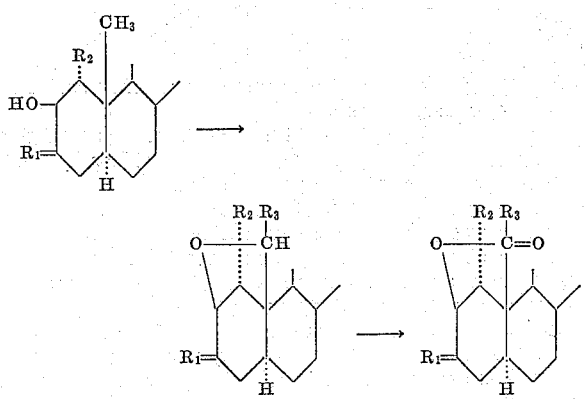

in which formulae R₁ represents two hydrogen atoms, a hydrogen atom together with an etherified or esterified hydroxyl group, or a ketalized oxo group, R₂ stands for a hydrogen or halogen atom or an etherified or esterified hydroxyl group, R₁ and R₂ taken together may also represent the radical of a dibasic acid or of a lower aliphatic or araliphatic diol and R₃ is a hydrogen or an iodine atom or a free or esterified hydroxyl group.

For the sake of simplicity the 5α-hydrogen atom is not mentioned in the following part of the description. The starting materials for the present process are 2β-hydroxy compounds of the androstane, pregnane, cholane, cholestane, stigmastane, spirostane and cardanolide series, which may contain in the ring system, especially in one or more of the positions 1, 3, 4, 6, 7, 8, 9, 11, 12, 14, 15, 16, 17, 20 and 21 further substituents, such as free or functionally converted oxo groups, esterified or etherified hydroxyl groups, lower alkyl or alkenyl groups, e.g., methyl, ethyl, vinyl, or allyl groups, and/or halogen atoms. Functionally converted oxo groups are ketalized oxo groups or oxo groups converted into enol derivatives, e.g., enol ethers or enol esters. Furthermore the starting materials may contain double bonds or oxido groups for example in positions 9,11 and/or 16,17.

Valuable starting materials are, for example, such 2β-hydroxy steroids which contain in position 3 and, if desired, also in position 1, the substituents R₁ and R₂ as indicated above; such substituents are suitable for the formation of the Δ¹-3-oxo-grouping after opening of the 2β,19-oxido bridge. There are particularly to be mentioned derivatives of 1α,2β,3α-trihydroxy-steroids, such as cyclic carbonates, sulfites, acetonides or benzal compounds, or especially 3-esters and 3-ethers of 3,2β-dihydroxy-1α-halogensteroids or ketals of 3-oxo-2β-hydroxy-1α-halogensteroids.

Specific starting materials are for example the following compounds:

2β-hydroxy-3β:17β-dibenzoyloxy-androstane,
2β-hydroxy-3β:17β-dibenzoyloxy-17α-methyl-androstane,
The cyclic 1:3-carbonate or the 1:3-acetonide of 1α:2β:3α-trihydroxy-17-oxo- and -17β-benzoyloxy-androstane,
1α-chloro-2β-hydroxy-3β:17β-dibenzoyloxy-androstane,
1α-bromo-2β-hydroxy-3β:17β-dibenzoyloxy- or -didecanoyloxy-androstane,
1α-chloro-2β-hydroxy-3β:17β-dibenzoyloxy- or 1α-chloro-2β-hydroxy-3β-benzoyloxy-17β-acetoxy - 17α - methyl-androstane,
The cyclic 1:3-carbonate or the 1:3-acetonide of 1α:2β:3α-trihydroxy-20-benzoyloxy - 5α - pregnane, 2β-hydroxy-17β-actoxy- or-hexahydrobenzoyloxy-5α-androstane or 2β-hydroxy-17β-acetoxy-17α-methyl-5α-androstane.

Said starting materials are known or, if new, can be prepared according to known methods.

Advantageously, the above-mentioned 1α - chloro - 2β-hydroxy-3β-acyloxy compounds are prepared by reduction of the corresponding Δ¹-3-oxo-steroids by means of a complex-metal hydride, acylation of the hydroxyl group so formed, and then addition of hypochlorous acid onto the 1:2-double bond.

The cyclic 1:3-carbonate or the 1:3-acetonide used as starting material is prepared by benzoylating the above-mentioned Δ¹-3β-hydroxyl compound, which is itself obtainable by reduction of a Δ¹-3-oxo-steroid, and then converting the benzoate so obtained by chromatography on aluminum oxide into the corresponding Δ¹-3α-hydroxy-steroid in the manner described by Tamm and Albrecht (Helv. Chim. Acta 42, 2177 (1960)). Epoxidation of the 1:2-double bond and the subsequent acid hydrolysis of the crude epoxide, yield the 1α:2β:3α-trihydroxy compound, which is converted into the desired acetonide by treatment with acetone in the presence of anhydrous copper sulfate, or into the corresponding cyclic carbonate by treatment with phosgene in the known manner.

The 19-nor-steroids unsubstituted at the 3-position, may be prepared from the 3-unsubstituted 2β-hydroxy compounds, obtainable by the catalytic reduction of the 2-ketones. Especially suitable 3-unsubstituted 2β-hydroxy compounds are 2β-hydroxy-17β-acetoxy- or -hexahydrobenzoyloxy-androstane, 2β-hydroxy - 17β-acetoxy-17α-methyl-androstane and 2β-hydroxy-spirostane. The 2-oxo-compounds can be prepared from the corresponding 3-oxo-steroids by methods known per se, e.g., by bromination in position 2, transformation of the resulting 2-bromo-3-ketone by heating with pyridine into the 2-pyridinium salt, oxidation of the latter according to Kröhnke to the nitrone, which can be hydrolyzed to the 2,3-dioxo-steroid. Treatment of the mentioned diketone with p-toluene-sulfonic acid chloride in pyridine leads to the 2-oxo-3-enol-tosylate, which can be smoothly hydrogenated to the 3-unsubstituted 2-ketone, or directly to the corresponding 2β-hydroxy-steroid.

The compounds generating monovalent positive iodine, used in the process of the invention, are for example N-iodo-carbonic acid amides or imides, such as N-iodo-acetamide or N-iodo-succinimide, or iodine bromide or iodine chloride; furthermore alkylhypoiodites which can be prepared, for example, by reaction of iodine and alcohols with heavy metal oxides, such as mercuric oxide, silver oxide or lead oxide. Especially good yields of $2\beta,19$-oxido-steroids are obtained by using acylhypoiodites, which are preferably obtained by the action of iodine on heavy metal salts of lower aliphatic, cycloaliphatic, araliphatic or aromatic carboxylic acids, such as acetic, propionic, trifluoroacetic, hexahydrobenzoic, phenylacetic or benzoic acid. The heavy metals mentioned above are especially such of the first and second sub group of the periodic system, such as silver or mercury. A very suitable method consists in reacting the $2\beta$-hydroxy-steroids with iodine and lead tetraacylates. It is especially advantageous to prepare the iodine reactant, especially the acylhypoiodites, in the above described manner in the reaction medium itself. The process can, for example, be carried out in the following manner: the starting material is dissolved or suspended in a solvent which is inert to the oxidative agent, such as hydrocarbons, then there is added, e.g., lead tetraacetate, iodine and, if desired, a weak base, such as calcium carbonate, and the reaction mixture is heated with stirring under normal or super-atmospheric pressure. The reaction can also be carried out in a completely analogous manner with silver acylates or mercuric acylates, such as acetates, and iodine, or the complexes resulting from the interactions of these reactants, or with N-iodo-carboxylic amides or imides, preferably in the presence of iodine. Particularly suitable solvents are saturated cyclic hydrocarbons such as cyclohexane, methylcyclohexane or dimethylcyclohexane. Likewise suitable are aromatic hydrocarbons, such as benzene, or halogenated hydrocarbons, such as carbon tetrachloride, hexachlorobutadiene or the like, or mixtures of said solvents. The requisite time of reaction depends on the temperature and/or the solvent used. When the reaction is performed with lead tetraacetate in boiling cyclohexane it is as a rule complete after ½ to 3 hours. Non-polar solvents favor the homolytic decomposition of the 2-hypoiodites which may have been formed during the reaction according to the present process, as compared to the heterolytic decomposition which would lead to 2-ketones. When a hypoiodous acid derivative is used, especially an acylhypoiodite, it is of advantage to use an excess thereof, because these substances likewise undergo homolytic decomposition to carbon dioxide and alkyliodide.

From the acetyl hypoiodite arising from the reaction of lead tetraacetate with iodine, for example, methyl iodide and carbon dioxide form easily.

It is of advantage to perform the present reaction at an elevated temperature ranging for example from 50 to 150° C. The reaction can be accelerated by irradiating the reaction solution with visible and/or ultra-violet light. In many cases it is of further advantage to add to the irradiated reaction solution an excess of free iodine.

The $2\beta,19$-oxido-steroids obtained according to the process of the invention contain as a rule in the 19-position a substituent, but as minor products also some 19-unsubstituted $2\beta,19$-oxido-steroids are obtained. If lead tetraacylates and iodine are both used in excess, there are first formed 19-iodo-$2\beta,19$-oxido-steroids which are then partially converted into 19-hydroxy- and 19-acyloxy-$2\beta,19$-oxido-steroids. When a very short reaction time is chosen, that is to say when the reaction occurring in the process of this invention is interrupted before all of the starting material has disappeared, the reaction mixture contains also $2\beta$-hydroxy-19-iodo-steroids, which easily are converted into 19-unsubstituted $2\beta,19$-oxido-steroids, for example by treatment with bases. If silver or mercuric acylates and iodine or, for example, N-iodo-succinimide and iodine are used, mixtures of 19-unsubstituted $2\beta,19$-oxido-steroids and 19-hydroxy- and 19-acyloxy-$2\beta,19$-oxido-steroids are obtained.

In the optional oxidation step, for example in aqueous solvents, such as acetone and aqueous chromic acid-sulfuric acid mixture, the 19-iodo-, 19-hydroxy- and 19-acyloxy-$2\beta,19$-oxido-steroids can be converted easily into $2\beta,19$-lactones of $2\beta$-hydroxy-steroid-19-acids.

If desired, the oxygenated C-19-methyl-group of 19-unsubstituted $2\beta,19$-oxides can be further oxidized under more drastic conditions, which can be effected, for example, by using strong oxidation agents, such as ruthenium tetroxide or especially derivatives of hexavalent chromium, e.g., chromic acid or tertiary butyl chromate, in solvents, such as lower fatty acids, e.g., acetic or propionic acid or chlorinated hydrocarbons, e.g., carbon tetrachloride, especially at an elevated temperature, such as between 50 and 100°. There are obtained $2\beta,19$-lactones of $2\beta$-hydroxy-steroid-19-acids. The latter may be reduced, for example according to the process of U.S.A. patent application Ser. No. 180,025, filed March 15, 1962, by Albert Wettstein et al., now U.S. Patent No. 3,111,531, with dialkyl-aluminumhydrides, such as diisobutyl aluminum-hydride at low temperature. The reduction products are $2\beta,19$-oxido-19-hydroxy-compounds which are the cyclohemiacetals of $2\beta$-hydroxy-19-oxo-steroids.

On the other hand, an acyloxy group present in a $2\beta,19$-oxide obtained by the present process, for example in position 3 and 17 or 20, can be hydrolyzed and the resulting hydroxy compound oxidized to a 3-ketone, 3,17-diketone or 3,20-diketone.

The $2\beta,19$-oxido steroids obtained according to the present invention can be transformed into pharmacologically active compounds, for example, as follows: a $1\alpha$-halogeno $2\beta,19$-oxido-17-oxo-androstane can be reacted with an alkyl-metal, alkenyl-metal or alkinyl-metal compound, for example with methyl magnesium iodide, methyl lithium, ethyl magnesium iodide, isobutyl lithium, allyl magnesium bromide, methallyl magnesium bromide, sodium acetylide, potassium acetylide or lithium acetylide, propargyl magnesium bromide, lithium methylacetylide or the like, whereby without the $1\alpha$-halogeno group being attacked—the corresponding $17\beta$-hydroxy-$17\alpha$-alkyl-, -alkenyl- or -alkinyl-androstanes are obtained.

It is further possible to introduce a $17\alpha$-hydroxy and/or 21-hydroxy group in known manner into a resulting $2\beta,19$-oxido-20-oxo-pregnane, more especially, for example, by enol acetylation to form the $\Delta^{17(20)}$-20-acetate followed by oxidation with peracetic acid and hydrolysis to the $17\alpha$-hydroxy-20-ketone.

$2\beta,19$-oxides containing no halogen in the positions $1\alpha$ and 3 are easy to open hydrolytically or acylolytically. It is of special advantage to perform the opening with an acylating agent in the presence of an acid catalyst, using for example a carboxylic acid anhydride, such as acetic or propionic anhydride, or a mixed anhydride of a carboxylic acid with formic or trifluoroacetic acid. Suitable acid catalysts are compounds of the type of the known Lewis acids, for example boron trifluoride, zinc chloride, ferric chloride or the like, the use of which gives rise to $2\beta,19$-diacyloxy compounds. Other acid catalysts such as para-toluenesulfonic acid, sulfuric or perchloric acid and an acid anhydride, on the other hand, give rise to $\Delta^1$- and $\Delta^2$-19-acyloxy-steroids, which may be converted by known methods into the known and physiologically important $\Delta^1$-3-oxo-steroids, for example by treating the $\Delta^1$- or $\Delta^2$-19-acyloxy-steroid with selenium dioxide, tertiary butyl chromate, chromium trioxide or with bromo-succinimide and replacing the halogen atom by a hydroxyl group followed by oxidation. The $2\beta,19$-oxides can also be converted into $1\alpha$-halogeno-19-acyloxy-steroids with acid halides, for example acetyl chloride or acetyl bromide, if desired with addition of hydrochloric or hydrobromic acid; in these latter compounds it is easy to eliminate the 1-halogen atom with formation of a 1,2-double bond in known manner, more especially after having formed a 3-oxo group by hydrolyzing a 3-acyloxy group followed by oxidation. The conversion of the 19-oxygenated $\Delta^1$-3-ketones so obtained into the 19-nor-steroids may be carried out in known manner, for example by treatment with a methanolic solution of sodium hydroxide, and this may be carried out, if desired, after first converting the 19-hydroxyl group into an oxo- or carboxyl function.

The 1α-halogeno-2β,19-oxides are difficult to open with hydrolytic means. On the other hand, it is surprisingly easy to open the 2β,19-oxygen bridge under reducing conditions, more especially with reducing agents that are suitable for reducing halohydrins to olefines. Particularly suitable are metallic reducing agents, for example alkali or alkaline earth metals, such as sodium, potassium, lithium or more especially calcium, advantageously dissolved in liquid ammonia or in an amine, such as ethylamine, isopropylamine, ethylenediamine or the like, if desired with addition of a diluent, such as ether, tetrahydrofuran or dioxane.

Of special industrial value is the reduction with zinc, using as solvent an alcohol or advantageously a lower aliphatic carboxylic acid, such as acetic acid, propionic acid or the like, if desired with addition of a diluent, such as benzene, dioxane or the like.

The opening under reducing conditions is particularly easy to perform in the case of 1α-bromo-2β,19-oxides and of the 3-oxo-2β,19-oxido-1α-halogeno-steroids obtainable from 3-acyloxy-2β,19-oxides by hydrolysis and oxidation. Whenever the opening of 2β,19-oxides is performed under reducing conditions, Δ¹-19-hydroxy-steroids are obtained.

The acetonide or cyclic carbonate of the 1α,3α-dihydroxy-2β,19-oxido-steroids, obtained as products of the reaction may, after hydrolysis of the acetonide or carbonate, be partially oxidized at the 3-position. The 1α-hydroxy-3-oxo-2β,19-oxides so obtained, undergo reductive cleavage, for example with zinc in glacial acetic acid, to yield the corresponding 19-oxygenated Δ¹-3-ketones directly.

The 2β,19-oxido-19-hydroxy-steroids obtained by the present process, which may also be prepared from the corresponding 19-acetates by mild alkaline or acid hydrolysis, are very easy to oxidize to form 2,19-lactones of 2β-hydroxy-steroid-19-acids. For this purpose an oxidizing agent is used, such as manganese dioxide or chromium trioxide, preferably in pyridine, or alternatively potassium permanganate. These lactones are identical with those obtained by the energetic oxidation of the 2β,19-oxides described above.

The 2β,19-oxido-1α-halogen-19-hydroxy-steroids and the 2,19-lactones of 2β-hydroxy-1α-halogen-steroid-19-acids are very easy to open under reducing conditions with the substances mentioned above, more especially with zinc and a lower fatty acid, for example acetic acid. After the reduction a very good yield of Δ¹-19-oxo-steroids or Δ¹-steroid-19-acids respectively is obtained. Dehydrogenation with selenium dioxide or by means of 2,3-dichloro-5,6-dicyano-benzoquinone leads, in the case of 3-oxo-steroids to the Δ¹,⁴-3,19-dioxo-compounds or to the corresponding 19-acids, which are easily decarboxylated to the ring-A-aromatic steroids.

The present invention also provides 2β,19-oxido-5α-steroids. The new compounds belong to the androstane, pregnane, cholane, cholestane, stigmastane, spirostane and cardanolide series. They contain substituents preferably at the 3-position and also, if desired, at the 1-position, which enable the formation of a Δ¹-3-oxo-grouping, and therefore are, above all, the 1:3-dihydroxy-steroids and their derivatives and the 1-halo-3-hydroxy steroids and the ethers and esters thereof. The invention further provides the lactones of 2β-hydroxy-steroid-19-acids, which may contain substituents at the 3-position and, if desired, also at the 1-position, which enable the formation of a Δ¹-3-oxo grouping, and are, for example, the 2β,19-lactones of 1,3-dihydroxy-steroids and derivatives thereof, and the 2β,19-lactones of 1-halo-3-hydroxy-steroids and the ethers and esters thereof.

Above all, the invention provides saturated and unsaturated 2β,19-oxido compounds of the spirostane-, androstane- and pregnane series, for example 1α-halo-3-hydroxy-2β,19-oxido-spirostanes, and the esters of these compounds and, for example, compounds of the formulae

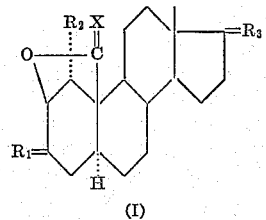

(I)

and

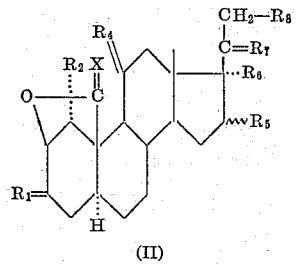

(II)

in which formulae $R_1$ represents two hydrogen atoms, a hydrogen atom together with a free, esterified or etherified hydroxyl group, an oxo group or a lower alkylenedioxy group, $R_2$ stands for a hydrogen or halogen atom or for a free, esterified or etherified hydroxyl group, $R_1$ and $R_2$ taken together may also represent the radical of a dibasic acid or of a lower aliphatic or araliphatic diol, $R_3$ represents an oxo or lower alkylene-dioxy group, a hydrogen atom or a lower aliphatic hydrocarbon residue, such as an alkyl-, alkenyl- or alkinyl group, together with a β-positioned free, esterified or etherified hydroxyl group, X and $R_4$ stand for two hydrogen atoms, a hydrogen atom together with a free or esterified hydroxyl group or for an oxo group, $R_5$ is a hydrogen atom, a methyl group or a free, esterified or etherified hydroxyl group, $R_5$ and $R_6$ when taken together may also represent the radical of a lower aliphatic or araliphatic diol, $R_6$ and $R_8$ represent a hydrogen atom or a free or esterified hydroxyl group and $R_7$ is a hydrogen atom together with a free or esterified hydroxyl group, an oxo group or a lower alkylenedioxy group.

The acid residues in the above-mentioned esters are especially those of aliphatic-, cycloaliphatic-, araliphatic- and aromatic carboxylic acids having 1–15 carbon atoms, for example those of formic, methyl- or ethyl-carbonic, acetic, trifluoroacetic, propionic butyric, trimethylacetic, valeric, caproic, enanthic, decanoic, hexahydrobenzoic, cyclopentylpropionic, phenyl-propionic, benzoic or furoic acid.

Etherified hydroxyl groups are for example lower alkoxy groups or the tetrahydropyronyloxy group.

Specific reaction products are for example: 1α-chloro-3β-acetoxy-2β,19-oxido-spirostane and the corresponding 1α - halo - 3 - oxo - 2β,19 - oxido - spirostanes, 1α - halo-3-hydroxy- and 1α-hydroxy-2β,19-oxido-androstanes and esters thereof such, for example, as the 1,3-carbonate and the acetonide of 1α,3α-dihydroxy-2β,19-oxido-17-oxo-androstane, 1α-chloro-3β,17β-dihydroxy- and 1α-bromo-3β, 17β-dihydroxy-2β,19-oxido-androstane and their esters, 1α-chloro- and 1α-bromo-3β-hydroxy-2β,19-oxido-17-oxo-androstane and the esters thereof, 1α-chloro- and 1α-bromo-3β,17β-dihydroxy-2β,19-oxido-17α-alkyl- and especially -17α-methyl- and -17α-ethyl-androstane and their esters, 1α-chloro- and 1α-bromo-3β,17β-dihydroxy-2β,19-oxido-17α-ethinyl-androstane and the esters thereof. There may also be mentioned the 1α-halo- and 1α-hydroxy-3-oxo-androstanes and the esters thereof corresponding to the above compounds, and the 2β,19-oxidoandrostanes that are unsubstituted at the 3-position, for example 2β,19-oxido-17β-hydroxy-androstane and the esters thereof, 2β,19-oxido-17β-hydroxy-17α-methyl-androstane and the esters thereof, and 2β,19-oxido-17-oxo-androstane.

The invention further provides 1α-halo-3-hydroxy- and 1α,3α-dihydroxy-2β,19-oxido-pregnanes and esters of these compounds, for example such compounds which contain a free or esterified hydroxyl group or a free or ketalized oxo group at the 20-position and especially 1α-chloro- and 1α-bromo-3β,20-dihydroxy - 2β,19 - oxido-pregnane and esters thereof, 1α-chloro- and 1α-bromo-3β-hydroxy-2β,19-oxido-20-oxo-pregnane and esters thereof, 1-α-chloro- and 1α-bromo-3β,17α-dihydroxy-2β,19-oxido-20-oxo-pregnane and esters thereof, and the 1,3-carbonate and acetonide of 1α,3α-dihydroxy - 2β,19 - oxido-20-oxo-pregnane and esters thereof. Also provided are the 1α-halo-3-oxo-pregnanes corresponding to these compounds, and the esters thereof.

The invention also provides 2β,19-oxido-19-hydroxy-steroids and esters thereof (that is to say, the hemi-acetals of 2β-hydroxy-19-oxo-steroids), and the 2β,19-lactones of 2β-hydroxy-steroid-19-acids, above all those of the spirostane-, androstane- and pregnane series, and especially provides such compounds in which the 3-position contains a free, esterified or etherified hydroxyl group and the 1α-position contains a halogen or a hydroxyl group. As examples of these compounds, there may be mentioned the following:

1α-halo-3β,17β,19-trihydroxy-2β,19-oxido-androstanes and esters thereof,

1α-halo-3β,19-dihydroxy-2β,19-oxido-17-oxo-androstanes and esters thereof, and

2β,19-oxido-17β,19-dihydroxy-androstanes and esters and 17α-alkyl derivatives thereof.

Furthermore, the following compounds should especially be mentioned:

The 2β,19-lactones of 1α,2β,3α-trihydroxy-17-oxo-androstane-19-acids,

The 2β,19-lactones of 1α-chloro-3β,2β,17β, trihydroxy-androstane-19-acids and the corresponding 3,17-diacylates, The 2β,19-lactones of 3β,2β-dihydroxy-17-oxo-androstane-19-acids and the 3-acylates thereof, and The 2β,19-lactones of 2β,17β-dihydroxy-androstane-19-acids and the 17-acylates thereof.

The present invention also provides modifications of the above process, wherein only a part of the process is carried out and, if desired, the various stages thereof being carried out in an order different from that given above, or wherein the starting material used is an intermediate obtained from any stage of the process, the remaining stages being carried out subsequently.

The following examples illustrate the invention:

*Example 1*

4.5 grams of pre-dried lead tetra-acetate and 1.0 gram of calcium carbonate are briefly heated at 80° C. in 200 cc. of cyclohexane. 1.25 gram of iodine and 1.0 gram of 1α-chloro-2β-hydroxy-3β,17β-dibenzoyloxy-5α-androstane are added to the above suspension which is then boiled under reflux until the iodine coloration has completely disappeared. The reaction mixture is then cooled and filtered, the filtrate is washed with a solution of 10% strength of thiosulfate, dried with sodium sulfate and then evaporated under vacuum. 1.35 gram of an oily product is obtained, and this is dissolved in 10 cc. of pyridine, then treated with a suspension of 2 grams of silver chromate in 10 cc. of pyridine and 10 cc. of water and then stirred for 16 hours at 60° C. The mixture is then diluted with ether and water, the insoluble material is filtered off, the aqueous layer is separated and the ethereal solution is washed three times with water, then dried with sodium sulfate and evaporated under vacuum. The last traces of pyridine are removed under high vacuum. The amorphous product so obtained is dissolved in 20 cc. of a 1:1-mixture of petroleum ether and benzene and then chromatographed on silica gel. The same solvent is used to elute the oils mixed with the reaction product, and that are derived from the solvent. The 1α-chloro-3β,17β-dibenzoyloxy-2β,19-oxido-5α-androstane (10%) and a mixture (50%) comprising 1α-chloro-3β,17β-dibenzoyl-oxy-19-acetoxy-2β,19-oxido-5α-androstane and the 2,19-lactone of 1α-chloro-2β,hydroxy-3β,17β-dibenzoyloxy-5α-androstane-19-acid, which mixture is difficult to separate, are consecutively eluted with benzene and with benzene/ethyl acetate mixtures. In order to separate the mixture into its components, it is dissolved in a mixture of glacial acetic acid and water (ratio 2:1), then heated for 20 minutes at 100° C. and, after working up in the usual manner, it is re-chromatographed on silica gel. In this manner, the pure 2,19-lactone of 1α-chloro-2β-hydroxy-3β,17β-dibenzoyloxy-5α-androstane-19-acid (IR-bands at 5.68μ, 5.78μ and 6.25μ) and 1α-chloro-3β,17β-dibenzoyl-oxy-19-hydroxy-2β,19-oxido-5α-androstane, which latter has a characteristic double band at 2.80μ and 2.92μ in the IR-spectrum and which is converted quantitatively into the above-mentioned lactone by oxidation in acetone solution with chromosulfuric acid, are obtained.

The chlorohydrin used as starting material in the above-described reaction, is made in the following manner:

10.0 grams of Δ¹-3:17-dioxo-5α-androstane are dissolved in 100 cc. of absolute tetrahydrofurane and then stirred dropwise into a suspension of 5.0 grams of lithium-aluminum hydride in 200 cc. of tetrahydrofurane. The reaction mixture is boiled under reflux for 1 hour, then cooled, and the excess hydride is decomposed by the careful drop-wise addition of acetic acid, and, after adding the theoretical amount of water, the mixture is filtered. The filtrate is evaporated and yields 9.5 grams of Δ¹-3β,17β-dihydroxy-5α-androstene. A solution of this product in 80 cc. of pyridine is treated with 14.0 cc. of benzoyl chloride with cooling, and then allowed to stand for 16 hours at 20° C. 25 cc. of methanol are then added with cooling, and the reaction mixture is then concentrated under vacuum, the concentrate dissolved in ether, the ethereal solution shaken first with dilute hydrochloric acid, then with water and finally with a solution of sodium bicarbonate, dried and then evaporated under vacuum. 10.30 grams of crude Δ¹-3β,17β-dibenzoyloxy-5α-androstene are obtained, and may be purified by chromatographing on aluminum oxide.

The 7.0 grams of the dibenzoate so obtained are dissolved in 350 cc. of ether. 250 cc. of water and 6.5 grams of chloride of lime are then added, and the mixture is thoroughly shaken and then acidified with 4.0 cc. of glacial acetic acid. The mixture is then thoroughly stirred for 30 minutes, separated, and the ethereal solution is washed with a solution of sodium thiosulfate and then with water, then dried and finally evaporated. The residue is crystallized from ether/petroleum ether to yield 3.02 grams of 1α-chloro-2β-hydroxy-3β,17β-dibenzoyloxy-5α-androstane.

*Example 2*

100 cc. of absolute cyclohexane, 3.0 grams of pre-dried lead tetra-acetate and 1.0 gram of calcium carbonate that has been dried over phosphorus pentoxide, are stirred for 15 minutes at 80° C. The suspension is then cooled and 450 mgms. of iodine and 600 mgms. of the 1,3-acetonide of 1α,2β,3α-trihydroxy-17β-benzoyloxy-5α-androstane are added, and the reaction mixture is boiled and stirred under external radiation from a 500-watt lamp until the violet coloration has disappeared. The inorganic material is removed by filtering the reaction mixture, the clear filtrate is diluted with ether and then washed first with a solution of 10 grams of sodium thiosulfate in 100 cc. of water and then twice, each time with 100 cc. of water. It is then dried with sodium sulfate and evaporated under vacuum. The crude product so obtained is dissolved in 10 cc. of acetone and the solution is treated for 1 hour, at 0–5° C. with the calculated amount of a standard solution of chromosulfuric acid. After working up, an oily mixture is obtained which is twice purified chromatographically (on silica gel and aluminum oxide) to yield the 2β,19-lactone of the 1,3-acetonide of 1α,2β,3α-trihydroxy-17β-benzoyloxy-5α-androstane-19-acid in addition to other products.

Acid hydrolysis under the usual conditions, followed by mild oxidation with the calculated amount of N-bromoacetamide, of the above product provides the 2β,19-lactone of 1α,2β-dihydroxy-3-oxo-17β-benzoyloxy-5α-androstane-19-acid.

By dissolving 100 mgms. of the last-mentioned product in 25 cc. of acetic acid, adding 2 grams of powdered zinc, boiling the mixture for 1 hour under reflux, filtering, evaporating under vacuum, dissolving the residue in ether, filtering, evaporating, dissolving the residue in 10 cc. of tertiary butanol, adding 0.3 cc. of concentrated hydrochloric acid, boiling under reflux for 15 minutes and working up in the usual manner, 53 mgms. of $\Delta^1$-3-oxo-17β-benzoyloxy-19-nor-5α-androstene are obtained.

The acetonide used as starting material in the above process, may be made in the following manner:

6.5 grams of the $\Delta^1$-3β,17β-dibenzoyloxy-5α-androstene described in Example 1, are dissolved in the smallest possible amount of petroleum ether and then poured into a column filled with aluminum oxide (activity I), in which it is allowed to remain for 8 hours. The adsorbed product is then eluted in the usual manner. The product can be crystallized to yield the $\Delta^1$-3α-hydroxy-17β-benzoyloxy-5α-androstene. By oxidizing the product with per-acid, a mixture of the corresponding α- and β-epoxides is obtained.

1.50 grams of the crude epoxide are dissolved in 150 cc. of a mixture of benzene and acetone (in the ratio of 1:1), then 0.8 cc. of sulfuric acid of 20% strength is added and the mixture is boiled for 1 hour under reflux. The solution is then cooled, diluted with methylene chloride and ether, and then worked up in the usual manner. The crude 1α,2β,3α-trihydroxy-17β-benzoyloxy-5α-androstane is dissolved in 100 cc. of acetone, then treated with anhydrous copper sulfate and stirred for 64 hours at 20° C. The inorganic material is then filtered off, the acetone solution evaporated under vacuum and the desired crude 1,3-acetonide of 1α,2β,3α-trihydroxy-17β-benzoyloxy-5α-androstane is obtained and may, if desired, be purified by multiple re-crystallization.

Example 3

A hot suspension of 600 mg. of lead tetraacetate and 300 mg. of calcium carbonate in 22 cc. of cyclohexane is treated with 100 mg. of 2β-hydroxy-17β-hexahydrobenzoyloxy-5α-androstane and 130 mg. of iodine and the mixture is refluxed for one hour while being stirred and irradiated with a 500 watt lamp, whereupon the color of iodine disappears substantially completely. The reaction mixture is then allowed to cool and filtered and the filtrate is washed with sodium thiosulfate solution and with water, dried with magnesium sulfate and evaporated, to yield 135 mg. of a mixture containing the crude 2β,19-oxido-17β-hexahydrobenzoyloxy-19-iodo- and acetoxy-5α-androstane, the 2β,19-oxido-17β-hexahydrobenzoyloxy-5α-androstane and the 2,19-lactone of the 2β-hydroxy-17β-hexahydrobenzoyloxy-5α-androstane-19-acid. The two last mentioned compounds can be separated by absorption chromatography on alumina. The 2β,19-oxido-17β-hexahydrobenzoyloxy-5α-androstane melts at 145–147° C. Infra-red bands inter alia at 5.81, 8.53, 8.83, 9.80, 9.92 and 11.45μ.

The 2β-hydroxy-17β-hexahydrobenzoyloxy-5α-androstane used as starting material is manufactured as follows:

3-oxo-17β-hexahydrobenzoyloxy-5α-androstane is brominated in dimethylformamide to give the corresponding 2-bromo-steroid melting at 175–176° C. Treatment of the latter compound for one hour at 100° C. with pyridine results in the formation of the 2-pyridinium salt (F. 300–302° C.), which is oxidized by p-nitroso-dimethylaniline to the corresponding nitrone (F. 198–199° C.). This compound can be hydrolyzed by treatment with diluted hydrochloric acid to the 2,3-dioxo-17β-hexahydrobenzoyloxy-5α-androstane (F. 218–219° C.). The resulting diketone forms a mixture of tosylates; the one melting at 179–182° C. is hydrogenated at 50° C. in ethanol using Raney-nickel as catalyst to give the 2β-hydroxy-17β-hexahydrobenzoyloxy-5α-androstane melting at 179–180° C.

Example 4

133 mg. of the crude mixture described in Example 3 in 4 cc. of acetone is treated with 0.15 ml. of an 8 N-solution of chromium trioxide in aqueous sulfuric acid and the whole is stirred for one hour at 0° C. Usual working up furnishes 112 mg. of a crude crystalline product. After chromatography on neutral alumina there are received 50 mg. of the 2,19-lactone of the 2β-hydroxy-17β-hexahydrobenzoyloxy-5α-androstane-19-acid melting at 163° C. Its infra-red spectrum contains bands inter alia at 5.67, 5.81, 7.05, 8.53, 8.80, 10.02 and 10.37μ.

What is claimed is:

1. Process for the manufacture of a member selected from the group consisting of a 2β,19-oxido-5α-steroid of the androstane, pregnane, cholane, cholestane, stigmastane, spirostane and cardanolide series, wherein a corresponding 19-unsubstituted 2β-hydroxy-5α-steroid is treated with a compound generating monovalent positive iodine.

2. Process as claimed in claim 1, wherein a member selected from the group consisting of an N-iodocarbonic acid amide and an N-iodocarbonic acid imide is used as compound generating monovalent positive iodine.

3. Process as claimed in claim 1, wherein an acyl-hypoiodite is used as compound generating monovalent positive iodine.

4. Process as claimed in claim 1, wherein the reaction is carried out in the presence of iodine.

5. Process as claimed in claim 1, wherein a lead tetraacylate and iodine is used as compound generating monovalent positive iodine.

6. Process as claimed in claim 5, wherein lead tetraacetate and iodine are used.

7. Process as claimed in claim 1, wherein the reaction is carried out in a saturated cyclic hydrocarbon.

8. Process for the manufacture of a member selected from the group consisting of a 2β,19-lactone of 2β-hydroxy-19-acid-steroid selected from the group consisting of the androstane, pregnane, cholane, cholestane, stigmastane, spirostane and cardanolide series, wherein a corresponding 19-substituted 2β,19-oxido-steroid obtained by the process of claim 1 is oxidized with chromic acid.

9. Process for the manufacture of a member selected from the group consisting of a 2β,19-lactone of 2β-hydroxy-19-acid-steroid of the androstane, pregnane, cholane, cholestane, stigmastane, spirostane and cardanolide series, wherein a corresponding 19-unsubstituted 2β,19-oxido-steroid obtained by the process of claim 1 is oxidized with a member selected from the group consisting of ruthenium tetroxide and an oxidizing derivative of chromic acid.

10. A compound of the formula

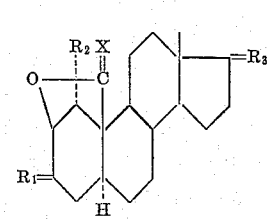

in which $R_1$ represents a member selected from the group consisting of two hydrogen atoms, a hydrogen atom together with a hydroxyl group, a hydrogen atom together with an esterified hydroxyl group and an oxo group, $R_2$ represents a member selected from the group consisting of a hydrogen atom, a chlorine atom, a bromine atom, a hydroxyl group and an esterified hydroxyl group, $R_1$ and $R_2$ taken together represent a lower alkylenedioxy group, $R_3$ represents a member selected from the group consisting of an oxo group, a hydrogen atom together with a β-positioned hydroxyl group, a hydrogen atom together with a β-positioned esterified hydroxyl group and a lower alkyl group together with a β-positioned hydroxyl group and X represents a member selected from the group consisting of two hydrogen atoms, a hydrogen atom together with a hydroxyl group, a hydrogen atom together with an esterified hydroxyl group, and an oxo group, the esterified hydroxyl groups being derived from acids selected from the group consisting of aliphatic, cycloaliphatic, araliphatic and aromatic carboxylic acids having 1–15 carbon atoms.

11. A compound of the formula

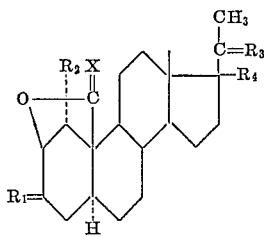

in which $R_1$ and $R_3$ each represents a member selected from the group consisting of a hydrogen atom together with a hydroxyl group, a hydrogen atom together with an esterified hydroxyl group and an oxo group, $R_2$ represents a member selected from the group consisting of a chlorine atom, a bromine atom, a free hydroxyl group and an esterified hydroxyl group, $R_1$ and $R_2$ taken together represent a lower alkylenedioxy group, $R_4$ represents a member selected from the group consisting of a hydrogen atom, a free and an esterified hydroxyl group, X represents a member selected from the group consisting of two hydrogen atoms, a hydrogen atom together with a hydroxyl group, a hydrogen atom together with an esterified hydroxyl group and an oxo group, the esterified hydroxyl groups being derived from acids selected from the group consisting of aliphatic, cycloaliphatic, araliphatic and aromatic carboxylic acids having 1–15 carbon atoms.

12. 3β,17β - dibenzoyloxy - 2β,19 - oxido-1α-chloro-5α-androstane.

13. 2β,19 - oxido - 17β-hexahydrobenzoyloxy-5α-androstane.

14. 3β,17β,19 - trihydroxy - 2β,19-oxido-1α-chloro-5α-androstane-3β,17β-dibenzoate.

15. 2β,19 - oxido - 17β - hexahydrobenzoyloxy-19-iodo-5α-androstane.

16. 2β,19 - oxido -17β-hexahydrobenzoyloxy-19-acetoxy-5α-androstane.

17. The 2β,19-lactone of 2β-hydroxy-3β,17β-dibenzoyloxy-1α-chloro-5α-androstane-19-acid.

18. The 2β,19-lactone of the 2β-hydroxy-17β-hexahydrobenzoyloxy-5α-androstane-19-acid.

19. The 2β,19-lactone of 1α,2β-dihydroxy-17β-benzoyloxy-3-oxo-5α-androstane-19-acid.

20. The 2β,19-lactone of the 1,3-acetonide of 1α,2β,3α-trihydroxy-17β-benzoyloxy-5α-androstane-19-acid.

No references cited.

LEWIS GOTTS, *Primary Examiner.*